Dec. 15, 1964     R. A. RANDALL ETAL     3,161,736
OMNIDIRECTIONAL SWITCH

Filed March 11, 1963     2 Sheets-Sheet 1

INVENTORS
Robert A. Randall
Donald F. Wilkes
BY

Attorney

Dec. 15, 1964   R. A. RANDALL ETAL   3,161,736
OMNIDIRECTIONAL SWITCH

Filed March 11, 1963   2 Sheets-Sheet 2

INVENTORS
Robert A. Randall
Donald F. Wilkes
BY

Attorney

United States Patent Office 3,161,736
Patented Dec. 15, 1964

3,161,736
OMNIDIRECTIONAL SWITCH
Robert A. Randall and Donald F. Wilkes, Albuquerque, N. Mex., assignors, by mesne assignments, to the United States of America as represented by the United States Atomic Energy Commission
Filed Mar. 11, 1963, Ser. No. 264,745
6 Claims. (Cl. 200—61.45)

The present invention relates generally to electrical switches and more particularly to an electrical switch actuable in response to conditions occurring during gravimetric accelerations that result in forces tending to nullify normal gravitational forces. These forces may be present during, for example, free fall, fallistic trajectory, or orbital flight.

Net acceleration forces, i.e., the difference between the acceleration of gravity (about 32.17 feet per second per second) and the actual acceleration of a body dropping towards the surface of the earth due to gravitational pull, that are less than the acceleration of gravity or 1 g are becoming increasingly important in propulsion and space programs since bodies in flight may contain mechanisms and circuits operable in response to gravimetric acceleration levels less than the acceleration of gravity. A body containing a device capable of sensing and performing a control function in response to net accelerations is not necessarily continuously oriented in such a position that the device can properly sense the net accelerations, thus necessitating the use of a gravimetric condition sensing device that is responsive to net acceleration forces regardless of the orientation of the body carrying the device.

Accordingly, a principal object of the present invention is to provide an electrical switch responsive to fractional $g$ conditions irrespective of the orientation of the body carrying the electrical switch with respect to the surface of the earth.

Another object of the present invention is to provide a new and improved fractional $g$ switch of relatively rugged, compact, lightweight, and reliable construction.

Another object of the present invention is to provide a fractional $g$ switch highly resistant to shock and vibration.

A further object of the present invention is to provide a fractional $g$ switch with time delay means for preventing switch actuation until after the fractional $g$ condition has existed for a predetermined duration.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

Figure 1:
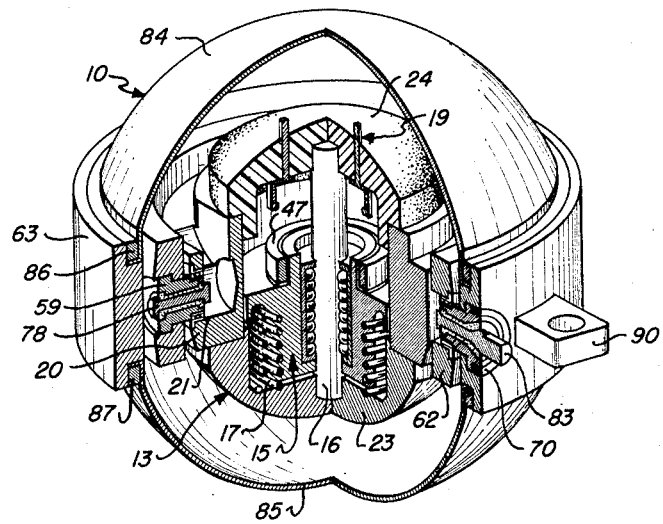
FIG. 1 is a schematic perspective view of switching mechanism of the present invention omnidirectionally mounted within a gimbal assembly.

Generally and with reference to FIG. 1, the present invention comprises a housing 10 which contains a gimbaling arrangement having three concentrically arranged annular rings with bearing mounted pivot points therebetween. The gimbal arrangement supports a gravimetric condition sensing switch assembly 13 in such a manner that it is insensitive to orientation of the housing 10. The switch assembly 13 includes a mass 15 slidable on a centrally mounted guide shaft 16 under the influence of a calibrated normally compressed compression spring 17 to "short" or otherwise actuate a set of contacts 19 upon attainment of or less than the desired fractional force. The mass 15 is of such a normal "weight" or normally exerts such force with respect to the strength of the spring 17 that at any force greater than a desired fractional force, the spring 17 is restrained from expanding by the weight of the mass 15. However, when this restraining force drops below the desired fractional force, the effective weight of or force exerted by the mass decreases sufficiently in value that the force imparted to the mass 15 by the spring 17 dominates the effective gravitational force and urges the mass 15 against the contacts to actuate a responsive external circuit (not shown). The housing 10 including the switch assembly 13 may be substantially filled with a suitable damping fluid which is metered past the mass to provide a time delay and a damping arrangement whereby shock and vibration loads do not prematurely cause the mass to move against the contacts.

Figure 3:
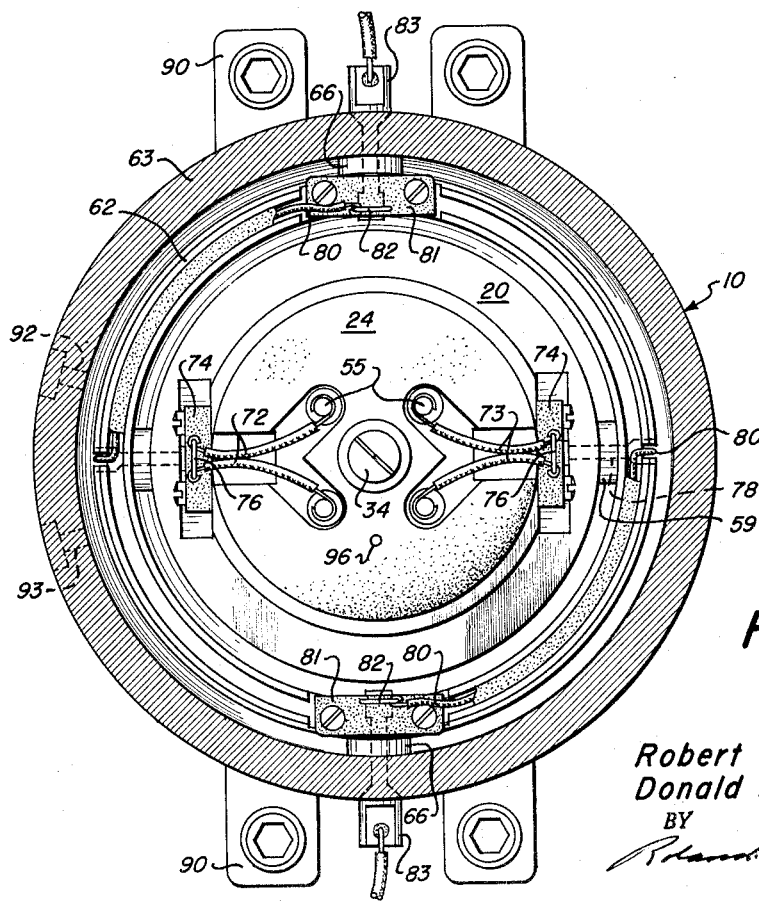
FIG. 3 is a top plan view with the upper cover plate removed showing the gimbaling arrangement and the electrical conductor paths.
Figure 2:
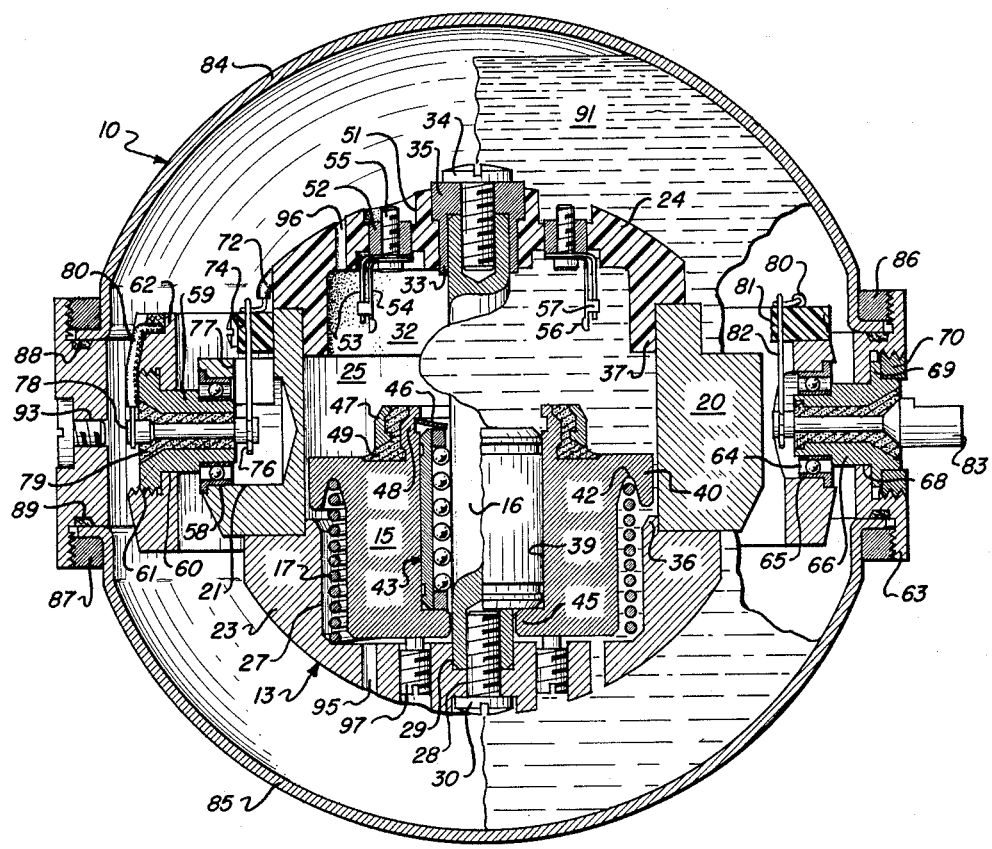
FIG. 2 is a partly cut away sectional view showing the details of the present invention with the outermost gimbal pivot point rotated ninety degrees for illustration purposes.

Described in greater detail and with reference to FIGS. 1–3, the fractional $g$ switch of the present invention is shown comprising a housing 10 of generally spherical configuration that supports the switch assembly 13 through the intermediation of concentrically disposed gimbal rings, as will be described in detail below. The switch assembly 13 comprises an annular metal ring 20 of generally rectangular configuration in cross section that is provided with a pair of cylindrical cavities or sockets (one of which is shown at 21) having the centers thereof circumferentially spaced 180° apart from each other in the outer surface of the ring for reception of gimbal ring pivot points as will be hereinafter described. End caps 23 and 24 of generally hemispherical configurations are adapted to be placed one on each side of the annular ring 20 so as to form an enclosed elongate volume 25 within the confines of the caps and the ring 20. Cap 23 is preferably made of a material substantially denser than the material of cap 24, such as, for example, a tungsten alloy, to insure that the center of gravity of the switch assembly is closed to end cap 23, i.e., below the axis of rotation of the switch assembly 13 as provided by the gimbal rings. Thus, end cap 23 due to its pendulum-like mounting always seeks a position "below" cap 24. Cap 23 may be provided with a circular generally cup-shaped flat bottomed cavity 27 extending substantially the width of the volume 25. An aperture 28 (FIG. 2) may be provided through the center of the cap 23 and include a counter-bore 29 on the cavity side thereof for reception of one end of the shaft 16 which may, in turn, be secured to the end cap 23 by a suitable threaded bolt 30 or the like passing through the aperture 28.

End cap 24 is preferably made of a strong insulating material, such as, for example, the plastic diallyl phthalate, that weights considerably less than end cap 23. This end cap, like end cap 23, may have a circular generally cup-shaped, flat-bottomed cavity 32 in the inner surface thereof and be provided with a centrally disposed aperture 33 for receiving the other end of the guide shaft 16.

In order to secure the end caps 23 and 24 to the ring 20, the guide shaft 16 may be initially secured to, say, end cap 23 which is then placed and held in its proper position on the ring 20. The end cap 24 may then be placed in its proper position on the ring 20 and thereafter a suitable threaded bolt 34 or the like may be passed through a bushing 35 mounted in the aperture 33 to secure cap 24 to the guide shaft 16. As bolts 30 and 34 are tightened, the end caps 23 and 24 are drawn tightly against the ring 20 to form a unitary assembly.

End caps 23 and 24 may be provided with annular lip-like projections 36 and 37 respectively, that are adapted to extend into the central opening of the annular ring 20 and be disposed in close proximity to the inner surface thereof. These lip-like projections 36 and 37 provide alignment for the end caps 23 and 24 with the ring 20 and assure that when the caps are secured to the ring 20, relative movement between the various components of the unitary assembly is substantially minimized.

Prior to securing the end cap 24 to the guide shaft 16 or at any other suitable time, the mass 15 and the compression spring 17 may be placed within the cavity 27 of end cap 23. The mass 15 is shown of a cylindrical configuration having a centrally disposed bore 39 therethrough and an annular radially extending flange 40 on an outer peripheral surface thereof that may be provided with an annular spring receiving groove 42 opening towards the end cap 23. The mass 15 may be provided with a relatively flat bottom so as to allow a substantial portion of the mass to be received within the cavity 27. The diameter of the mass 15 inwardly of the flange 40 is somewhat less than the diameter of the cavity 27 so that sufficient clearance remains between the mass and the side walls of the cavity to enable the helically wound compression spring 17 to be readily disposed therebetween. The spring 17 so positioned has one end thereof resting against the end cap 23 at the bottom of the cavity 27 and the other end extending into the groove 42 in the flange 40. The diameter of the annular flange 40, on the other hand, is greater than the diameter of the end cap cavity 27 so that only a slight clearance remains between the flange and the inner walls of the annular ring 20. The purpose of providing this slight clearance between the flange 40 and the ring 20 is for fluid metering and mass damping as will be described in detail hereinafter. Any suitable mass weight may be used with a spring of sufficient strength to move the mass in response to the desired fractional load. For example, a mass weighing about 90 grams may be used with a spring having a rate of about .06 pound per inch of compression. While the spring 17 is preferably of the helically wound variety, it will appear clear that other types of yieldable means may be used such as, for example, Belleville washers and the like.

The central passage or bore 39 through the mass 15 is adapted to receive the guide shaft 16 so that the mass may slide therealong in response to desired conditions and short or otherwise actuate the contacts 19 to control an external circuit in some manner. In order to assure that the mass 15 slides along the shaft 16 with minimum frictional forces therebetween, it may be desirable to place and secure a recirculating ball bushing 43 or like in the bore 39 so that the balls provide the contacting surface between the mass and the shaft. The ball bushing 43, which may be of any suitable commercially available type capable of providing substantially frictionless relative movement between the mass and shaft, may be secured in the mass in any desirable manner. For example, the ball bushing may be secured by abutting one end of the ball bushing against an inwardly extending lip 45 on the mass and holding it there with a suitable locking ring 46 placed over the other end of the ball bushing and engaging a notch in the mass.

Actuation of the contacts 19 may be attained by providing the mass with a metal actuating or shorting ring 47 which is electrically insulated from the mass 15. The shorting ring 47, which may be provided with a beveled leading edge for easing the mating with the contacts 19, may be secured to an upright annular projection 48 on the mass by a suitable insulating cement 49, or in any other desired manner.

Four circumferentially spaced apart apertures 51 may be provided through end cap 24 about the central aperture 33 for receiving electrical contact mountings, each of which may comprise an annular internally threaded insert 52 of brass or the like that is pressed fit into the apertures 51. Each mounting supports a single contact comprising a pair of section 53 and 54 which extend inwardly into the cavity 32 so as to be in alignment with the shorting ring 47 and which are affixed in the mounting by a suitable bolt 55 passing through and mating with the threads in the insert 52. Contact section 53 may be made of a relatively stiff metal for providing support for the contact 54 which may be made of a relatively flexible metal to provide a better contacting arrangement with the shorting ring 47. The flexible contact 54 may be provided with a small lobe 56 on the distal end thereof and radially extending tabs 57 (one of which is shown) intermediate the ends thereof. The lobed end of the contact section 54 may be initially biased away from the section 53 and then moved a desired distance toward section 53 so as to be in proper alignment with the shorting ring 47. The tabs 57 may then be bent about the stiff contact section 53 to provide a contacting surface that is positive and yet sufficiently resilient as to be non-engaging with shorting ring 47. It may be desirable to extend the lip 37 on end cap 24 towards the end cap 23 so that the flange 40 on the mass 15 may under actuated conditions abut against end of the lip 37 and prevent the shorting ring 47 from binding against the innermost portion of the contacts 19. The four contacts 19 in the end plate 24 are preferably divided into two pairs with the contacts of each pair being coupled to a common terminal (FIG. 3). This arrangement sets forth a desirable feature in that if the switch assembly 13 is subjected to sufficient shock and vibration loads which may displace one of the pair of contacts out of alignment, then the other contact of that pair will normally be capable of contacting the shorting ring 47 and completing the circuit. However, while four such contacts are preferred, it will appear clear that any desired number and arrangement of contacts may be used.

The switch assembly 13 above described is gimbal mounted to achieve its omnidirectional qualities of sensing when the device is exposed to conditions or forces less than those required to restrain the mass 15 in the fully seated position, irrespective of the orientation of the housing 10. This gimbal mounting may comprise three concentrically arranged rings with two sets of pivot points therebetween. The innermost ring is the annular ring 20 of the switch assembly 13 and includes the circumferentially spaced apart sockets 21 which may be formed by drilling or in any other suitable manner. Each socket 21 may be provided with an annular ball bearing 58 which may be pressed fit or otherwise secured in the socket at a location contiguous to the periphery of the ring 20. Each ball bearing 58, in turn, receives one end of a hollow cylindrical shaft 59 which may have one end thereof extending about half-way into the socket 21 to provide the switch assembly 13 with a pivot point or axis of rotation.

An intermediate gimbal ring 62 is radially spaced from and encircles ring 20 and is provided with four apertures having their respective center lines circumferentially spaced 90° apart from each other about the ring. The ring 62 is arranged about the ring 20 so that two of these apertures (one of which is indicated at 60), which are in opposite sides of the ring 62, are disposed over the sockets 21 for receiving the shafts 59. Each shaft 59 is preferably secured in an aperture 60 so that no relative rotation occurs between the ring 62 and the shaft. A suitable manner of affixing the shaft 59 to ring 62 may be attained by providing the shafts 59 with externally threaded flanges 61 which are adapted to mate with internal threads in the walls of the apertures 60.

The pivot point or axis of rotation for the intermediate ring 62 may be provided by mounting the ring 62 to the outermost ring 63 in a manner somewhat similar to the mounting of the ring 20 to the intermediate ring 62. This mounting may comprise annular ball bearings 64 secured in each of the remaining two apertures (one of which is indicated at 65) in the ring 62 and a hollow cylindrical shaft 66 disposed in each bearing. These shafts 66 extend from the ball bearings 64 through apertures 68 in the ring 63 and are secured against rotation in the ring 63 in any suitable manner. For example, such securing may be attained by providing each of the shafts 66 with a radially extending flange 69 which is adapted to fit within an internally threaded counterbore in ring 63 and be secured by an externally threaded locking nut 70.

In order to electrically couple the contacts 19 to an external circuit (not shown) electrical conducting means may be attached to the contacts and passed through the gimbal pivot points. To attain this electrical path, each pair of contacts 19 may be provided with conductors 72 and 73 (FIG. 3) which extend from the lead-through bolts 55 across the end cap 24 and terminate at small insulating blocks 74 attached to the ring 20 adjacent each of the sockets 21. These conductors 72 and 73 may each be affixed to a metal, generally U-shaped clip-like member 76, the "legs" of which pass through the insulating blocks 74 and thence into the sockets 21 through openings 77 in the ring 20 and terminate adjacent the center of the sockets 21. A lead-through terminal 78 of a length greater than that of the shafts 59 may extend through and be insulatively mounted in each of the hollow shafts 59 by a suitable cement 79 so that the end of the terminal 78 extending into the socket 21 is engaged by the "legs" of the clip-like member 76 which bear against the surface of the terminal. The engagement between the member 76 and the terminal 78 is such that relative movement takes place therebetween enabling the switch assembly 13 to rotate about its axis while maintaining a positive electrical connection with the terminal 78. Another electrical conductor 80 is secured to the other end of each terminal 78 and extends about the top of the ring 62 to an insulating block 81 affixed to the ring 62 adjacent the aperture 65. This conductor is secured to a metal clip-like member 82 which may be similar to member 76 and which, in turn, may similarly engage one end of a lead-through terminal 83 insulatively mounted by cement or the like in the hollow shaft 66. The other end of the terminal 83 passes through the ring 63 and may be provided with a suitable mount for facilitating the connection of external circuitry thereto.

The switch assembly 13 and the gimbal ring 62 are preferably enclosed within the housing 10 which may comprise a pair of flanged hemispherical covers 84 and 85 secured to the annular ring 63 in any suitable manner, such as, for example, by a pair of threaded rings 86 and 87. Each of these threaded rings 86 and 87 is adapted to mate with a threaded surface on the annular ring 63 so as to bind the cover flanges therebetween. Annular deformable seals 88 and 89 may be placed between the cover flanges and the ring 63 to assure that the housing is fluid tight.

In order to mount the housing 10 to external structure so that the housing remains fixed with respect thereto, a suitable arrangement of mounting flanges 90 may project from the housing ring 63.

Damping fluid, as generally indicated at 91, may be introduced into the completed housing 10 and substantially fill the empty volume therein including the volume 25 within the assembly 13. In order to fill the housing with damping fluid a pair of openings 92 and 93 may be made in the ring 63 and to one of these openings a conduit from a pressurized fluid source (not shown) may be coupled while the other opening provides communication between the interior of the housing and a suitable evacuating system such as a vacuum pump (not shown). Thus, as the housing is evacuated the fluid is introduced into the housing to subtantially fill the latter. To enable the fluid to enter and fill the assembly 13, a pair of small passages or bores 95 and 96 may be made in end caps 23 and 24 respectively. It may also be necessary to hold the mass a slight distance from the bottom of the cavity 27 so that the fluid may enter through bore 95. This spacing between the mass and the end cap 23 may be attained by providing the end cap 23 with a pair of mass adjusting screws 97. With the fluid filling the empty volume 25 within the assembly 13, the mass 15 moves toward the contacts 19 at a controlled rate due to the fluid being metered through the space provided between the mass flange 40 and the inner surface of the ring 20. This metering feature also provides suitable damping properties to prevent shocks and vibrations from prematurely moving the mass against the contacts. The fluid may be of any desirable type that will provide suitable lubricating and damping properties. One such fluid found desirable is a silicone oil having a density of about .65 centistoke at room temperature.

The primary purpose of the adjusting screws 97 is to provide a means for initially positioning the mass 15 so that the time duration between the attainment of the desired fractional g load and the actuation of the contacts is within prescribed limits.

In an operation where an aerodynamic body containing the switch of the present invention is initially propelled by a rocket propulsion system or the like away from an aircraft or other platform in, say, a ballistic trajectory, the switch of the present invention functions generally in the manner following. The acceleration of the body away from the platform by the rocket propulsion system causes the switch assembly 13 to orient itself on the gimbal mountings so that the heavier end cap 23 and the mass 15 tend to be retrogressive so that the mass is "set-back" against the spring 17. As the acceleration forces diminish, such as by terminating the operation of the rocket propulsion system, the gravitational pull acting upon the switch assembly urges the end cap 23 to swing back in the manner of a pendulum toward its initial position. During this return of the end cap 23 toward or to its initial position or sometime thereafter, depending upon the fractional g load preset into the switch, the effective weight of the relatively movable mass 15 decreases sufficiently due to the effect of gravity upon the switch assembly so as to enable the spring 17 to expand and move the mass 15 away from the relatively fixing cap 23 toward and against the contacts 19 to actuate an external circuit.

In another type of operation, for example, when a body containing the switch may be subjected to "free-fall" from an aircraft or the like, the end cap 23 remains essentially in its initial position, i.e., below end cap 24 with respect to the surface of the earth. As the body tends to accelerate towards the earth due to the pull of gravity, it approaches but does not actually attain the rate of acceleration due to gravity because of external forces such as aerodynamic drag and the like acting upon the body. Thus, the switch assembly is subjected to a fractional g loading or a net acceleration as above described to decrease the effective weight of the relatively movable mass 15 and thereby enable the spring 17 to expand and move the mass to actuate the contacts 19. This type of operation may be considered analogous to a descending elevator in that as the elevator begins its descent, a person riding therein receives the sensation that the elevator is dropping away from him. Thus, the person is subjected to a fractional g loading in much the same manner as the mass 15, since his effective weight acting upon the floor of the elevator actually decreases during this initial descent.

The contacts 19 are preferably incapable of engaging the shorting ring 47 in a manner that will hold the mass 15 in an actuated position and thereby maintain the contacts 19 in a shorted or actuated state. It may be desirable to place a timing circuit (not shown) in the contact circuit externally of the housing 10 to assure that if the shorting ring actuates the contact in response to relatively severe shock or vibration loads, the external circuit will not be prematurely actuated.

It will be seen that the present invention provides a unique switch means that is suspended by a gimbal system so that the switch seeks and senses the vector sum of all applied linear accelerations due to gravity. The fractional g forces necessary to actuate the switch may be as low as zero g with the fluid metering arrangement providing a time delay of about 0.6 second. Also, by using a mass of a particular weight and a spring with a particular strength, the fractional g force necessary to actuate the switch may be readily determined and varied.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. A device of the character described comprising in combination switch means including a housing having a cavity therein, contact means associated with said cavity, movable mass means disposed adjacent one end of the cavity, spring means normally under restraint and disposed intermediate said mass means and the housing adapted to move said mass means and actuate said contact means upon removal of the restraint upon said spring means, a further housing enclosing said switch means and comprising a pair of oppositely disposed cover means secured to an annular ring, and gimbal means operatively associated with said housings comprising a further annular ring disposed intermediate said housings and including a first pair of pivot means disposed intermediate said further annular ring and the first mentioned annular ring with the centers of said pivot means being circumferentially spaced 180° apart from each other, and a second pair of pivot means disposed intermediate said further annular ring and the housing for the switch means with the center of each of said second pair of pivot means being disposed circumferentially intermediate the centers of the first mentioned pivot means, said gimbal means adapted to normally maintain said switch means in a particular position irrespective of the orientation of said further housing.

2. The device claimed in claim 1 wherein the housing for the switch means includes another annular ring for reception of portions of said second pair of pivot means, each of said pivot means comprises an elongate hollow shaft having one end thereof secured against rotation in one of said annular rings and the other end of said shaft being received in bearing means in another of said rings for facilitating rotation of the latter, elongate terminal means is passed through and insulatively secured in each of said shafts, and wherein conductor means interconnect said terminal means and said contact means.

3. The device claimed in claim 2 wherein electrical conducting means are adapted to connect said conductor means to each of said terminals to facilitate relative rotation between said electrical conducting means and said terminal.

4. A device of the character described comprising in combination a pair of oppositely disposed cap means, annular ring means intermediate and engaging said cap means for forming a cavity therebetween, contact means associated with one of said cap means, movable means within said cavity adjacent the other of said cap means and normally spaced from said contact means, moving means disposed intermediate said other cap means and said movable means and normally restrained by said movable means adapted to move the movable means against said contact means upon removal of the restraint imposed by said movable means, another annular ring means surrounding said first mentioned ring means, means interconnecting both of said ring means at locations circumferentially spaced apart from each other for providing an axis of rotation for said first mentioned ring means, further ring means disposed about said another ring means, and further means interconnecting said another ring means and said further ring means at locations circumferentially spaced apart from each other and intermediate the means interconnecting the first mentioned ring means and said another ring means for providing an axis of rotation for said another ring means.

5. An omnidirectional switch comprising in combination a housing including an annular ring with a pair of oppositely disposed covers secured thereto, a switch assembly disposed within said housing comprising a further annular ring with a pair of oppositely disposed caps abutting thereagainst for forming an enclosed cavity between said caps, a shaft extending between and secured to said caps for maintaining the latter against said further annular ring, contact means passing through one of said caps and extending into said cavity, a mass encircling and movable along said shaft and disposed in said cavity adjacent the other of said caps and normally spaced from said contact means, normally compressed spring means intermediate said other cap and said mass adapted to move said mass towards said contact means in response to removal of a restraining force acting upon said spring means, means disposed intermediate of and interconnecting both of said rings for facilitating relative rotation therebetween and thereby enabling said switch assembly normally to maintain a particular position irrespective of the orientation of the housing.

6. The device claimed in claim 5 wherein said housing including said cavity is substantially filled with liquid, and said mass is adapted to meter the liquid therepast to regulate the movement thereof.

References Cited by the Examiner
UNITED STATES PATENTS 2,900,471 8/59 Aske _____ 200—87
3,003,356 10/61 Nordsieck _____ 73—504
3,096,411 7/63 Chabrek et al. _____ 200—61.53

BERNARD A. GILHEANY, *Primary Examiner.*
ROBERT K. SCHAEFER, *Examiner.*